G. C. BOLLER.
TOOL FOR SIDE GRAFTING TREES AND SHRUBBERY.
APPLICATION FILED MAR. 7, 1917.
1,236,045. Patented Aug. 7, 1917.
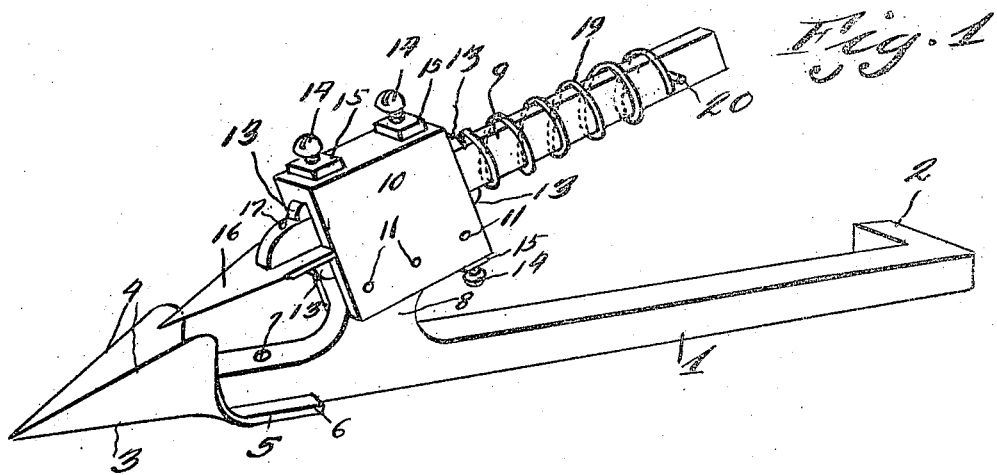
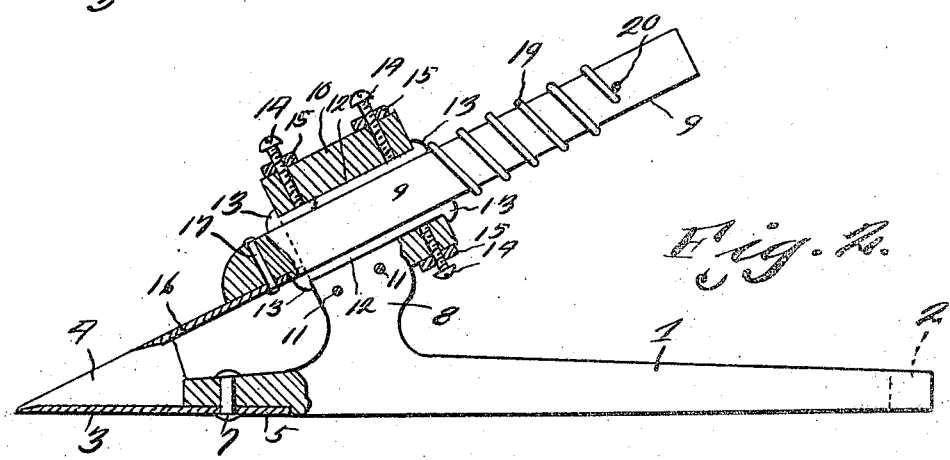
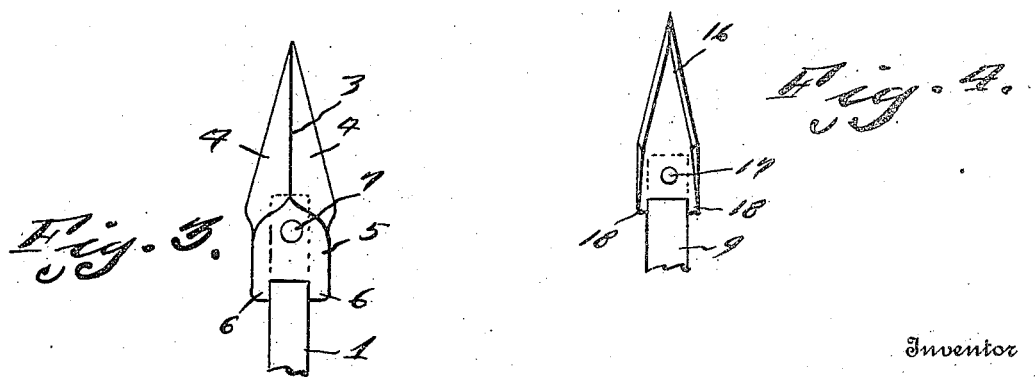

UNITED STATES PATENT OFFICE.

GEORGE CARL BOLLER, OF LOOMIS, CALIFORNIA.

TOOL FOR SIDE-GRAFTING TREES AND SHRUBBERY.

1,236,045.   Specification of Letters Patent.   Patented Aug. 7, 1917.

Application filed March 7, 1917. Serial No. 153,160.

*To all whom it may concern:*

Be it known that I, GEORGE C. BOLLER, a citizen of the United States, residing at Loomis, in the county of Placer, State of California, have invented a new and useful Tool for Side-Grafting Trees and Shrubbery; and I do hereby declare the following to be a full, clear, and exact description of the invention, such as will enable others skilled in the art to which it appertains to make and use the same.

This invention relates to grafting tools in general and is particularly a tool for the side grafting of all kinds of fruit trees, rose bushes and other kinds of shrubbery.

Its principal object is to facilitate the operation of grafting by providing means for the performance of the work with accuracy, so that a positive union between the main branch and the scion is effected.

Another object is to provide a tool capable of making a tapered trihedral incision in a tree trunk or branch, the shape of the incision being such that the scion to be grafted can be easily shaped to conform thereto.

Another object is to provide a tool that can be manufactured at low cost but that will be stout enough to withstand the rough usage to which it is subjected.

The invention comprises in general a gouge member adapted to be driven into the trunk. A reciprocatory chisel member superimposed on this gouge member is capable of being driven into the trunk after the gouge has been inserted the required depth, the two members coacting to form a tapered trihedral aperture in the trunk in which aperture a scion may be effectively grafted.

The invention is set forth in a specific structure to which, however, it is not to be restricted. Practice may require certain changes and alterations and these the right is claimed to make, provided they be comprehended in spirit by the appended claims.

A uniform system of designating the various parts of the invention obtains in all of the figures of the drawing, wherein:

Figure 1 is a perspective view of the invention.

Fig. 2 is a longitudinal view partly in section and partly in elevation.

Fig. 3 is a plan view of the gouge looking at the bottom of the same.

Fig. 4 is a bottom plan view of the chisel, showing its connection to its attendant bar.

The invention comprises the gouge bar 1 having an integral right angled bend 2. At the forward end the gouge 3 is attached to this bar, the bar being cut away on the bottom to allow the gouge to lie flush therewith. The gouge 3 is formed of a single piece of metal, preferably tool steel, the cutting blades 4 being shaped to form two sides of a trihedral pyramid. Where they engage the bar 1, these blades blend into the flat piece 5 which exceeds the bar 1 in width and is recessed at its back edge, leaving the projections 6 which abut the bar 1 on its sides adjacent to the cut-away portion. The rivet 7 secures the gouge 3 to the bar 1 and the projections 6, engaging the sides of the bar, preclude any turning movement of the gouge on this rivet.

Adjacent to the gouge 3, the bar 1 has a projection 8 arising from its upper edge. This projection is planed off on the upper edge at the same angle of inclination as the cutting edges of the gouge. It forms a support for the chisel bar 9, a channel member 10 being secured to it by rivets 11 and holding the chisel bar 9 in alinement. The liners 12 having projections 13 (to prevent their displacement longitudinally) interpose between the upper edge of projection 8 and the bar 9 and the inner face of the web of the channel member 10 and the bar 9. Adjusting screws 14 with their lock nuts 15 are adapted to set against the liners 12 and provide means for taking up wear that may occur on the bar 9.

The chisel 16 is secured to the forward end of the bar 9 by the rivet 17, the projections 18 which abut the sides of the bar 9 preventing any turning of the chisel on its riveted connection. The end of the bar 9 is cut away on the under edge, so that the lower face of the chisel will lie flush with this edge. The plane of the chisel 16 is such as to bring the latter into a position to complete the trihedral pyramid partly formed by the cutting blades 4 when the bar 9 is moved toward these blades.

A spiral spring 19, surrounding the bar 9 and compressed between the pin 20 and the projections 13, serves to keep the chisel normally away from the gouge 3, the projections 18 abutting the legs of the channel member 10 to limit the backward movement of the chisel.

The grafting operation is effected by first driving the gouge 3 into the trunk or limb of the tree to which the scion is to be grafted. The gouge is made to penetrate the trunk by driving or tapping on the end of bar 1. When the gouge 3 has penetrated the required depth, the operation is completed by the chisel 16 which is inserted by forcing or lightly tapping on the end of bar 9. These two cutting operations of the chisel and the gouge result in removing a tapered trihedral piece from the trunk and the tool is easily disengaged therefrom by tapping on the upper or lower face of the angled bend 2. The aperture formed by this cutting operation is then suitable to receive the scion to be grafted on, the end of the scion being cut to conform to the shape of the aperture. The application of wax or asphalt to exclude the air then completes the graft, the sap strata of both tree and scion uniting and the scion surviving on the vitality thus obtained from the tree.

What is claimed is:

1. In a grafting tool, a gouge, a bar supporting the gouge, said gouge having the shape of a trihedral pyramid, said bar having a lateral projection, a second bar slidably supported on said projection and movable in a plane angularly disposed with reference to the plane of the first named bar, a chisel on said movable bar, said chisel lying in the plane of the third side and adapted to be operated to form the third side of the trihedral pyramid partially formed by the gouge, guiding means for the movable bar, and adjustable means to compensate for wear on the movable bar.

2. In a grafting tool, a gouge, a bar supporting the gouge, said gouge having the shape of a trihedral pyramid, said bar having a lateral projection, a second bar slidably supported on said projection and movable in a plane angularly disposed with reference to the plane of the first named bar, a chisel on said movable bar, said chisel lying in the plane of the third side and adapted to be operated to form the third side of the trihedral pyramid partially formed by the gouge, guiding means for the movable bar, adjustable means to compensate for wear on the movable bar, and a compression spring adapted to hold the movable bar and chisel normally away from the gouge.

3. In a grafting tool, a gouge, a bar supporting the gouge, said gouge having the shape of a trihedral pyramid, said bar having a lateral projection, a second bar slidably supported on said projection and movable in a plane angularly disposed with reference to the plane of the first named bar, a chisel on said movable bar, said chisel lying in the plane of the third side and adapted to be operated to form the third side of the trihedral pyramid partially formed by the gouge, a channel member surrounding the movable bar and engaging the projection to act as a guide for said bar, adjustable means to compensate for wear on the movable bar, and a compression spring adapted to hold the movable bar and chisel away from the gouge.

4. In a grafting tool, a gouge, a bar supporting the gouge, said gouge having the shape of a trihedral pyramid, said bar having a lateral projection, a second bar slidably supported on said projection and movable in a plane angularly disposed with reference to the plane of the first named bar, a chisel on said movable bar, said chisel lying in the plane of the third side and adapted to be operated to form the third side of the trihedral pyramid partially formed by the gouge, a channel member surrounding the movable bar and engaging the projection to act as a guide for said bar, liners engaging the upper and lower edges of the movable bar, set screws and lock nuts coöperating with the liners, and a compression spring adapted to hold the movable bar and chisel away from the gouge.

In testimony whereof I have signed my name to this specification in the presence of two subscribing witnesses.

GEORGE CARL BOLLER.

Witnesses:
S. J. RITCHIE,
PAT DUNN.